J. H. LACY.
WRITING GUIDE.
APPLICATION FILED OCT. 15, 1908.
926,427.
Patented June 29, 1909.
2 SHEETS—SHEET 1.
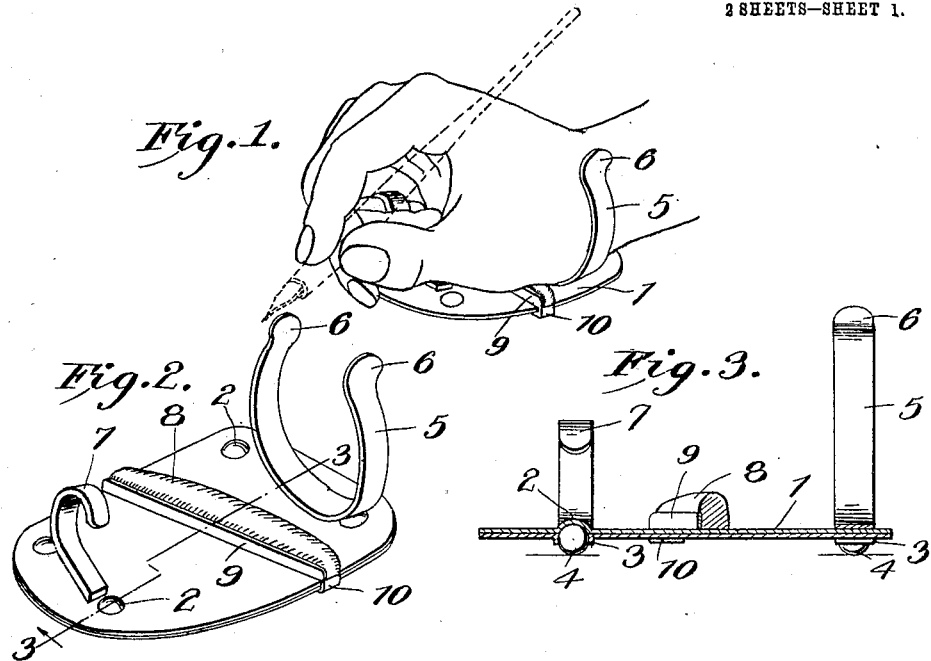
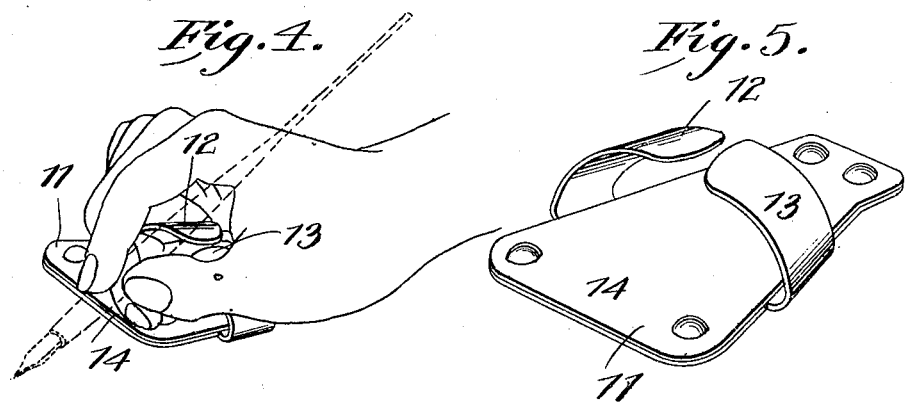
Witnesses
W. H. Rodwell
C. H. Griesbauer
Inventor
J. H. Lacy
By H. B. Willson & Co.
Attorneys
THE NORRIS PETERS CO., WASHINGTON, D. C.

J. H. LACY.
WRITING GUIDE.
APPLICATION FILED OCT. 15, 1908.
926,427.
Patented June 29, 1909.
2 SHEETS—SHEET 2.
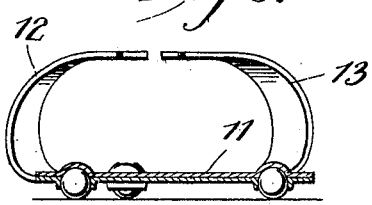
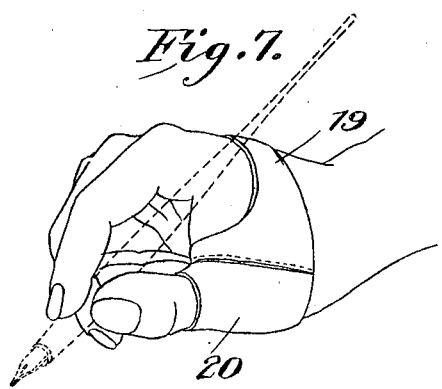
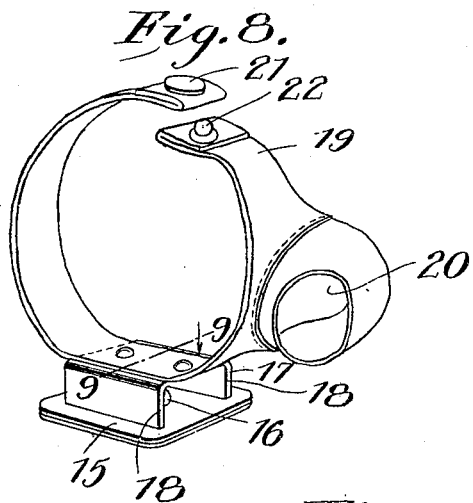
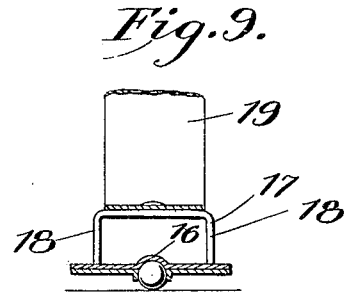
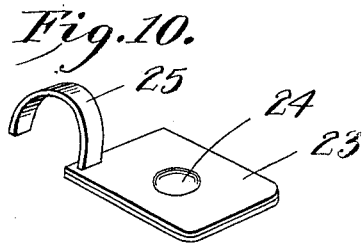
Witnesses
W. H. Rodwell
C. H. Griesbauer
Inventor
J. H. Lacy
By H. B. Willson &co
Attorneys

UNITED STATES PATENT OFFICE.

JOHN HUGH LACY, OF BARTOW, FLORIDA.

WRITING-GUIDE.

No. 926,427.   Specification of Letters Patent.   Patented June 29, 1909.

Application filed October 15, 1908. Serial No. 457,903.

*To all whom it may concern:*

Be it known that I, JOHN H. LACY, a citizen of the United States, residing at Bartow, in the county of Polk and State of Florida, have invented certain new and useful Improvements in Writing-Guides; and I do declare the following to be a full, clear, and exact description of the invention, such as will enable others skilled in the art to which it appertains to make and use the same.

This invention relates to improvements in guides for penmen and comprises the production of a simple ball bearing guide which may be readily secured to the hand of a writer and enable the formation of improved written characters.

One of the objects of the invention is to provide a simple guide whereby the hand of a writer may be kept from direct contact with the paper and the writing movement may be assisted by ball bearings arranged on the guide.

Another object of the invention is the production of a simple writing guide provided with means for readily securing the guide to a person's hand and with ball bearings securely and firmly held on the writing guide.

With the foregoing and other objects in view, the invention consists of certain novel features of construction, combination and arrangement of parts as will be more fully described and particularly pointed out in the appended claims.

In the accompanying drawings, Figure 1 is a perspective view showing the application of my improved writing guide; Fig. 2 is a detailed perspective view on an enlarged scale; Fig. 3 is a transverse sectional view taken on line 3—3 of Fig. 2; Fig. 4 is a perspective view of a modification applied to a person's hand; Fig. 5 is a detailed perspective view thereof on enlarged scale; Fig. 6 is a transverse section thereof; Fig. 7 is a perspective view of another modification applied to a person's hand; Fig. 8 is a similar view on an enlarged scale; Fig. 9 is a transverse section taken on line 9—9 of Fig. 8, and, Fig. 10 is a detailed perspective view of another modification.

Referring to Figs. 1, 2 and 3 of the accompanying drawings which are prepared for illustrative purposes and accordingly are not drawn to scale, numeral 1 designates a plate preferably formed of two sections which are securely soldered or brazed together and provided on its lower face with anti-friction means. The upper section of the plate 1 is preferably formed with ball bearings 2 which consist of upwardly bulged pockets and the lower section is formed with downwardly flared openings 3 through which balls 4 partly extend.

The plate 1 is provided preferably with antifriction means preferably comprising two ball bearings which are arranged at its forward end and spaced apart on said plate and at its rear end with two ball bearings which are likewise spaced apart thereon, and the corners of the edges of said plate are preferably rounded to prevent said plate from cutting the paper or injuring the user's hand. The rear end of the plate 1 is provided with a U-shaped resilient hand-engaging member 5 which is formed with inwardly curved ends 6, and the forward end of the plate 1 is provided with an upstanding finger engaging hook 7.

A cushion 8 is adjustably secured on the plate 1 by means of an upwardly flanged member 9 which is provided with inwardly bent ends 10, said ends being adapted to contact with the lower face of the plate 1. The hook 7 and the U-shaped member 5 are preferably disposed at a slight angle to the axis of the plate 1.

The writing device is applied to a person's hand by placing the upwardly projecting ends 6 of the U-shaped member 5 over the back of the hand and the hook 7 over the small finger and, when arranged in this manner, on the hand, the same is in position to be used. The cushion 8 serves to comfortably seat the hand on the device, and the ball bearings enable the device to be readily moved over a paper with very little effort, thereby considerably reducing the aggregate amount of resistance required in writing.

In Figs. 4, 5 and 6 I have illustrated a modification of my improved writing guide comprising a plate 11 formed of two sections, an upper and lower section, the lower section being formed with upstanding curved arms 12 and 13, and said plate is provided with the same number of ball bearings as the plate 1, and said ball bearings are similarly disposed thereon. The forward end 14 of the plate 11 is slightly wider than the rear end and the forward opening of the arms 12 and 13 is correspondingly larger than the rear opening of said arms. The device illustrated in Figs. 4, 5 and 6 is applied by placing the ring finger and the small finger under the arms 12 and 13 and moving the guide over the paper in the same manner as the guide illustrated in Figs. 1-4, inclusive, is moved. This modification can be secured to the hand more quickly and can be removed therefrom more quickly than the device illustrated in Figs. 1-3.

In Figs. 7, 8 and 9 I have illustrated another modification of my writing guide comprising a plate 15 which is provided with a single ball bearing 16 and an upstanding support 17 having legs 18 secured to the plate 15. The support 17 is provided with a flexible hand-engaging strap 19 which strap is formed with a thumb-engaging portion or pocket 20 and is provided with a socket 21 for receiving a button clasp 22.

The device illustrated in Figs. 7, 8 and 9 is applied to a person's hand by extending the thumb through the opening 20 and securing the ends of a strap 19 on the back of the hand by means of the clasp 22 and the socket 21.

In Fig. 10 I have illustrated another modification comprising the plate 23 provided with a single ball bearing 24 and an upstanding hook 25 which is secured on the plate 23 near one of the rear corners. The device illustrated in Fig. 10 may be secured to a person's hand by passing the hook over the ring finger and placing the plate under the thumb or by placing the hook over the thumb or one of the other fingers and securing it against a different portion of the hand.

In all of the modifications, the ball bearings are formed on the plate in the manner illustrated in Fig. 3. My improved guide provides means whereby the writing movement is comfortably facilitated and prevents the hand from soiling the writing paper. The ball bearings are so constructed that the balls comprising a part of said bearings cannot become loosened and cannot be removed except by cutting the plate.

Various changes in the form, proportion and the minor details of construction may be resorted to without departing from the principle or sacrificing any of the advantages of the invention as defined in the appended claims.

I claim as my invention:—

1. A writing device of the class described comprising a ball bearing plate, an upstanding finger-engaging hook secured on the forward end of the plate, a U-shaped member secured on the rear end of the plate, and a cushion secured on the plate.

2. A writing device of the class described comprising a ball bearing plate, an upstanding finger-engaging hook secured on the plate, a U-shaped member secured on the plate and a cushion slidably secured on the plate.

3. A writing device of the class described comprising a plate formed of two sections and provided with ball receiving pockets, a ball held in each pocket, an upstanding hook secured on the forward end of the plate, a cushion slidably secured on the plate, and a clip secured on the rear end of the plate.

4. A writing device of the class described comprising a plate provided on its lower face with anti-friction supporting means, and a cushion slidably secured on the plate.

5. A writing device of the class described comprising a plate, a cushion securing member formed with inwardly bent ends and upwardly projecting longitudinal flanges slidably arranged on the plate, and a cushion held between the flanges.

In testimony whereof I have hereunto set my hand in presence of two subscribing witnesses.

JOHN HUGH LACY.

Witnesses:
J. N. HOOKER,
C. C. HARPER.